United States Patent [19]

Henning

[11] Patent Number: 4,594,411
[45] Date of Patent: Jun. 10, 1986

[54] SULFONATED MONOAZO COLORANT LAKE OBTAINED BY DI-AZO COUPLING OF 5-ACETYLAMINO-2-AMINOBENZENE-1-SULFONIC ACID WITH 1-(3'-SULFOPHENYL)-3-METHYL-PHYRAZOL-5-ONE

[75] Inventor: Georg Henning, Ludwigshafen, Fed. Rep. of Germany

[73] Assignee: BASF Aktiengesellschaft, Ludwigshafen, Fed. Rep. of Germany

[21] Appl. No.: 617,155

[22] Filed: Jun. 6, 1984

Related U.S. Application Data

[62] Division of Ser. No. 546,164, Oct., 1983, abandoned, which is a division of Ser. No. 403,152, Jul., 1982, abandoned.

[30] Foreign Application Priority Data

Aug. 24, 1981 [DE] Fed. Rep. of Germany ....... 3133404

[51] Int. Cl.$^4$ ............... C09B 29/03; C09B 29/10; C09B 29/36; D06P 1/39
[52] U.S. Cl. ............... 534/784; 106/288 Q; 524/190; 534/573; 534/785; 534/786; 534/712
[58] Field of Search ............. 260/163, 147; 8/662, 8/928, 509, 573; 106/288 Q, 308 Q, 309; 534/784, 712, 785, 786

[56] References Cited

U.S. PATENT DOCUMENTS

| | | | |
|---|---|---|---|
| 849,690 | 4/1907 | Laska | 260/163 |
| 849,739 | 4/1907 | Laska | 260/163 |
| 901,675 | 10/1908 | Boniger | 260/163 |
| 935,370 | 9/1909 | Julius et al. | 260/163 |
| 935,830 | 10/1909 | Volkmann | 260/163 |
| 969,428 | 9/1910 | Volkmann | 260/163 |
| 983,132 | 1/1911 | Geldermann et al. | 260/163 |
| 1,084,363 | 1/1914 | Reyher | 260/163 |
| 1,098,600 | 6/1914 | Volkmann | 260/163 |
| 1,539,347 | 5/1925 | Boeniger | 260/163 |
| 1,701,248 | 2/1929 | Wagner et al. | 260/163 |
| 1,730,179 | 10/1929 | Wagner et al. | 260/163 |
| 1,731,150 | 10/1929 | Reber et al. | 260/163 |
| 1,794,218 | 2/1931 | Wagner et al. | 260/163 |
| 1,809,030 | 6/1931 | Geller | 260/163 |
| 1,856,413 | 5/1932 | Geller | 260/163 |
| 2,205,849 | 6/1940 | Fischer et al. | 260/163 |
| 2,220,598 | 11/1940 | Fischer et al. | 260/163 |
| 2,842,537 | 7/1950 | Strobel et al. | 260/163 |
| 2,898,178 | 8/1959 | Kruckenberg | 260/163 X |
| 3,802,836 | 4/1974 | Speck | 260/186 X |
| 3,839,316 | 10/1974 | Benz et al. | 260/162 |
| 4,045,425 | 8/1977 | Hunter | 260/163 |
| 4045425 | 8/1977 | Hunter | 260/163 |

FOREIGN PATENT DOCUMENTS

| | | | |
|---|---|---|---|
| 82107504 | 12/1982 | European Pat. Off. | 260/163 |
| 1098645 | 2/1961 | Fed. Rep. of Germany | 260/163 |
| 1151333 | 7/1963 | Fed. Rep. of Germany | 260/163 |
| 2616981 | 10/1977 | Fed. Rep. of Germany | 260/163 |
| 3133404 | 10/1983 | Fed. Rep. of Germany | 260/163 |
| 0067841 | 6/1975 | Japan | 260/163 |
| 3037732 | 4/1978 | Japan | 260/145 B |
| 128906 | 11/1958 | Switzerland | 260/163 |
| 128907 | 11/1958 | Switzerland | 260/163 |
| 384749 | 2/1965 | Switzerland | 260/163 |
| 874220 | 8/1961 | United Kingdom | 260/163 |
| 875882 | 8/1961 | United Kingdom | 260/163 |
| 1030755 | 5/1966 | United Kingdom | 260/163 |
| 1175666 | 12/1969 | United Kingdom | 260/163 |
| 1353521 | 5/1974 | United Kingdom | 260/163 |
| 1410862 | 10/1975 | United Kingdom | 260/163 |
| 1490139 | 10/1977 | United Kingdom | 260/163 |

OTHER PUBLICATIONS

Colour Index, 3rd edition, vol. 4, pp. 4127, 4128, 4129, 4131, and 4132.
Ullmann, 3.A.4. Bd.

*Primary Examiner*—Floyd D. Higel
*Attorney, Agent, or Firm*—Oblon, Fisher, Spivak, McClelland & Maier

[57] ABSTRACT

This invention relates to a method of dyeing thermoplastics with sulfonated monoazo colorant lakes having a sulfophenyl pyrazole substituent, of general formula

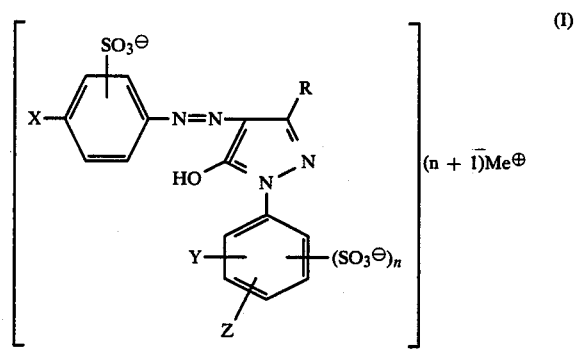

wherein R is $CH_3$ or $COO^-$; X is Cl, $CH_3$, $CH_3O$, $C_2H_5O$, $C_2H_5CONH$, $NH_2CONH$, $C_6H_5CONH$, $CH_3SO_2NH$, $C_6H_5SO_2NH$, $CH_3CONH$, or hydrogen; Y is hydrogen, Cl, or $CH_3$; Z is hydrogen or Cl, n is 0, 1 or 2; and $Me^+$ is one equivalent of a cation selected from the group consisting of $NH_4^+$, $Li^+$, $K^+$, $Na^+$, $\frac{1}{2}Sr^{2+}$, $\frac{1}{2}Mn^{2+}$, $\frac{1}{2}Ni^{2+}$, $\frac{1}{2}Ba^{2+}$, $\frac{1}{2}Mg^{2+}$ and $\frac{1}{2}Ca^{2+}$; with the proviso that if R is $COO^-$, the additional equivalent charge is compensated by a further equivalent of said or another cation. These compounds, which are insoluble in organic solvents and sparingly soluble in water, are useful as lakes with good pigmentary characteristics and possessing very good lightfastness in plastics, such as polyolefins, polyvinyl chloride, polystyrene, and ABS. They are also useful in surface coatings, and particularly suitable for coloring thermoplastics. Noteworthy is their good plasticizer fastness, their high stability to heat and the absence of blooming they produce when used.

1 Claim, No Drawings

SULFONATED MONOAZO COLORANT LAKE OBTAINED BY DI-AZO COUPLING OF 5-ACETYLAMINO-2-AMINOBENZENE-1-SULFONIC ACID WITH 1-(3'-SULFOPHENYL)-3-METHYLPHYRAZOL-5-ONE

This application is a division of application Ser. No. 546,164, filed Oct. 27, 1983, now abandoned, which is a division of application Ser. No. 403,152, filed July 29, 1982, now abandoned.

BACKGROUND OF THE INVENTION

Field of the Invention

This invention relates to sulfonated azo colorant lakes useful as pigments for plastic.

SUMMARY OF THE INVENTION

This invention relates to the dyeing of thermoplastics with sulfonated monoazo colorant lakes having a sulfophenyl pyrazole substituent, of the general formula:

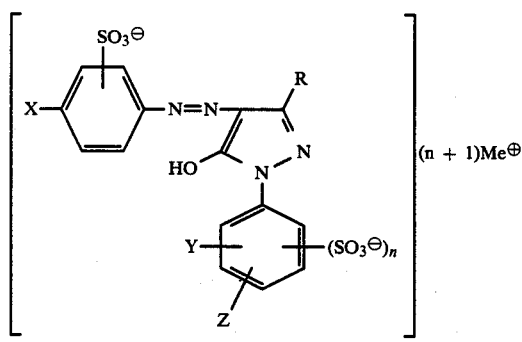

wherein R is $CH_3$ or $COO^-$; X is Cl, $CH_3$, $CH_3O$, $C_2H_5O$, $C_2H_5CONH$, $NH_2CONH$, $C_6H_5CONH$, $CH_3SO_2NH$, $C_6H_5SO_2NH$, $CH_3CONH$ or hydrogen, Y is hydrogen, Cl, or $CH_3$; Z is hydrogen or Cl, n is 0, 1 or 2; and $Me^+$ is one equivalent of a cation selected from the group consisting of $NH_4^+$, $Li^+$, $K^+$, $Na^+$, $\frac{1}{2}Sr^{2+}$, $\frac{1}{2}Mn^{2+}$, $\frac{1}{2}Ni^{2+}$, $\frac{1}{2}Ba^{2+}$, $\frac{1}{2}Mg^{2+}$ and $\frac{1}{2}Ca^{2+}$; with the proviso that if R is $COO^-$, the additional equivalent charge is compensated by a further equivalent of said or another cation.

Noteworthy is their good plasticizer fastness, their high stability to heat and the absence of blooming they produce when used.

DESCRIPTION OF THE PREFERRED EMBODIMENTS

The present invention relates to compounds of the general formula I

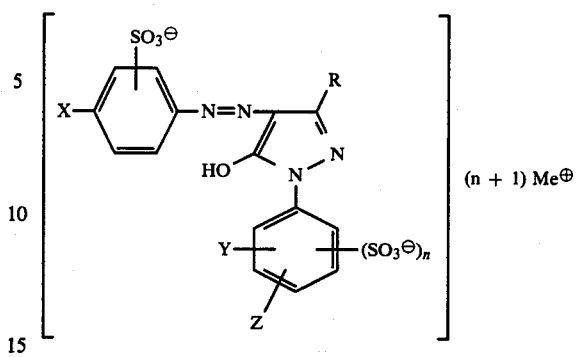

where R is methyl or $COO^\ominus$, X is chlorine, methyl, methoxy, ethoxy, acylamino or hydrogen, Y is hydrogen, chlorine or methyl, Z is hydrogen or chlorine, n is 0, 1 or 2 and $Me^\oplus$ is one equivalent of an ammonium or monovalent metal cation, and if R is $COO^\ominus$, the additional charge is compensated by a further $Me^\oplus$.

Examples of acylamino radicals X are $H_5C_2CONH$, $H_2NCONH$, $H_5C_6CONH$, $H_3CSO_2NH$, $H_5C_6SO_2NH$ and, preferably, $H_3CCONH$. Examples of cations $Me^\oplus$ are $NH_4^\oplus$, $Li^\oplus$, $\frac{1}{2}Sr^{2\oplus}$, $\frac{1}{2}Mn^{2\oplus}$, $\frac{1}{2}Ni^{2\oplus}$, $\frac{1}{2}Ba^{2\oplus}$, $\frac{1}{2}Mg^{2\oplus}$ and, in particular, $Na^\oplus$, $K^\oplus$ and $\frac{1}{2}Ca^{2\oplus}$.

The colorants of the formula I have pigmentary character, ie. they are insoluble in organic solvents and sparingly soluble in water. They have very good light-fastness in plastics, eg. polyolefins, polyvinyl chloride, polystyrene and ABS, and in surface coatings, and are particularly suitable for coloring thermoplastics. Their good plasticizer fastness, the absence of blooming and their high stability to heat are noteworthy.

Mixtures of colorants of the formula I having various cations are also very suitable for the above purposes.

Compounds of the formula I a

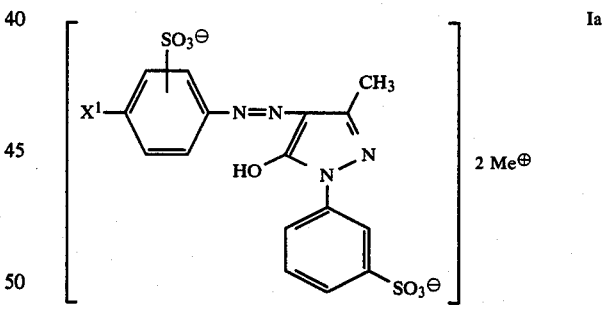

where $X^1$ is chlorine or acetylamino and $Me^\oplus$ has the above meanings, are of particular importance.

Preferred cations $Me^\oplus$ are $Na^\oplus$, $K^\oplus$ and $\frac{1}{2}Ca^{2\oplus}$, and mixtures of these cations.

In formula I, if R is $CH_3$, n is preferably 1, and if R is $COO^\ominus$, n is preferably 0.

The compounds of the formula I can be prepared by reacting a diazo compound of the amine of the formula

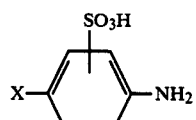

with a coupling component of the formula

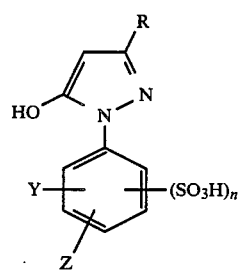

and converting the product into a metal salt.

In the Examples which follow and which illustrate the preparation, parts and percentages are by weight, unless indicated otherwise.

The above-disclosure generally describes the present invention. A more complete understanding can be obtained by reference to the following specific Examples, which are provided herein for the purposes of illustration only and are not to be limiting unless otherwise specified.

EXAMPLES

EXAMPLE 1

92 parts of 5-acetylamino-2-aminobenzene-1-sulfonic acid are dissolved in 1,000 parts of water with 25 parts by volume of 50% strength sodium hydroxide solution, and 80 parts by volume of concentrated hydrochloric acid are added. The mixture is cooled to from 0° to 5° C. with ice, and diazotization is effected by addition of 125 parts by volume of 25% strength sodium nitrite solution.

For the coupling, 124 parts of 1-(3'-sulfophenyl)-3-methylpyrazol-5-one are dissolved in 1,000 parts of water and 70 parts of sodium acetate. The diazonium salt suspension is then run into the coupling solution, and the pH is brought to 4–5 with 50% strength sodium hydroxide solution. The mixture is then stirred for one hour, the product is laked by addition of 120 parts of calcium chloride, stirring is continued for another hour and the product is filtered off, washed with water and dried. 185 parts of a red azo colorant lake of the formula

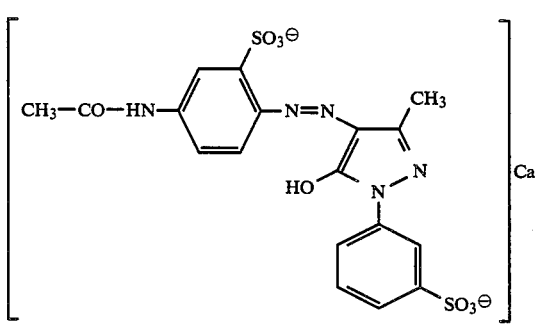

are obtained.

EXAMPLE 2

The procedure followed is as described in Example 1, but 124 parts of 1-(4'-sulfophenyl)-3-methylpyrazol-5-one are used instead of 124 parts of 1-(3'-sulfophenyl-3-methylpyrazol-5-one. 181 parts of a yellow colorant lake of the formula

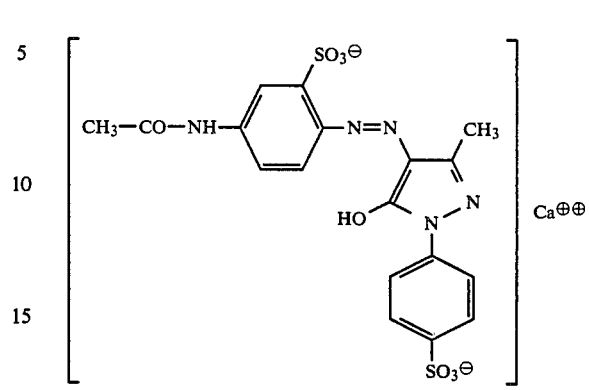

are obtained.

EXAMPLE 3

The procedure followed is as described in Example 1, but 127 parts of 1-(2'-methyl-4'-sulfophenyl)-3-methylpyrazol-5-one are used instead of 124 parts of 1-(3'-sulfophenyl)-3-methylpyrazol-5-one. 150 parts of a reddish-yellow colorant lake of the formula

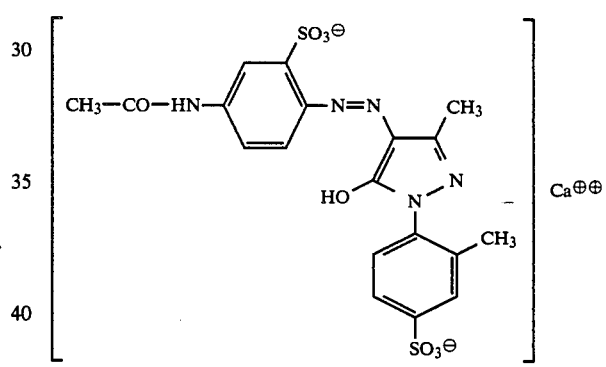

are obtained.

EXAMPLE 4

The procedure followed is as described in Example 1, but the coupling is carried out with 136 parts of 1-(2'-chloro-5'-sulfophenyl)-3-methylpyrazol-5-one instead of 124 parts of 1-(3'-sulfophenyl)-3-methylpyrazol-5-one. 200 parts of a yellow colorant lake of the formula

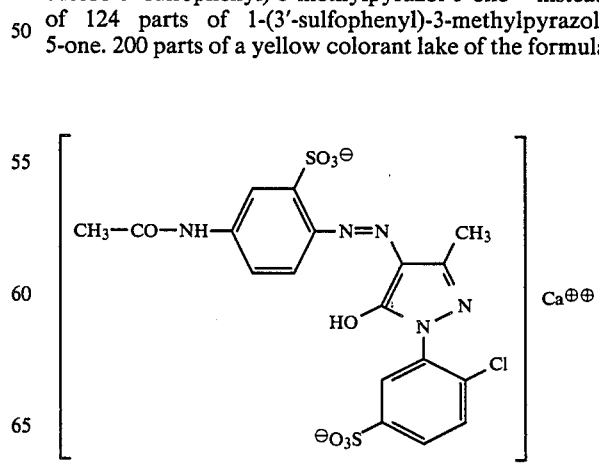

are obtained.

EXAMPLE 5

The procedure followed is as described in Example 1, but 150 parts of 1-(2',5'-dichloro-4'-sulfophenyl)-3-methylpyrazol-5-one are used instead of 124 parts of 1-(3'-sulfophenyl)-3-methylpyrazol-5-one. 220 parts of a yellow colorant lake of the formula

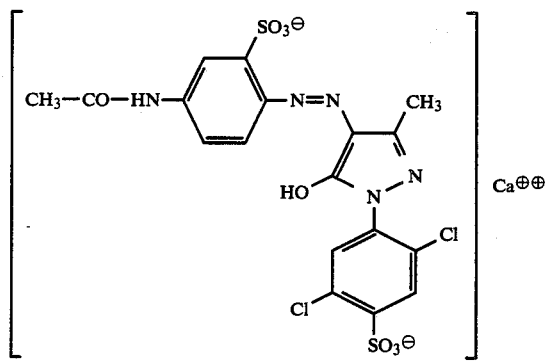

are obtained.

EXAMPLE 6

The procedure followed is as described in Example 1, but 200 parts of sodium chloride are used for laking instead of 120 parts of calcium chloride. 165 parts of a red sodium colorant lake of the formula

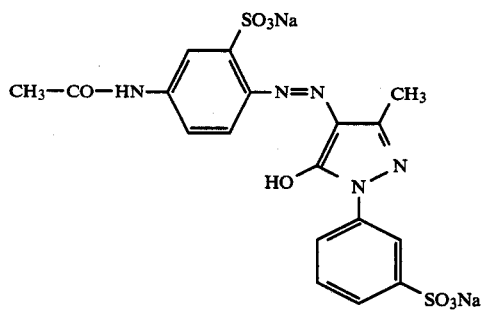

are obtained.

EXAMPLE 7

A diazonium salt is prepared as described in Example 1. 124 parts of 1-(3'-sulfophenyl)-3-methylpyrazol-5-one are then added and the pH is brought to 4–5 with 50% strength potassium hydroxide solution. 100 parts of potassium chloride are then also added, the mixture is stirred for another hour and the product is filtered off with suction, washed with water and dried. 196 parts of a yellowish red colorant lake of the formula

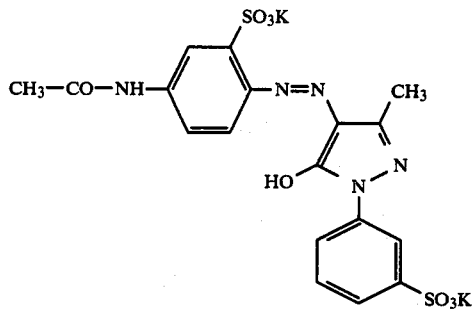

are obtained.

EXAMPLE 8

The procedure followed is as described in Example 7, but aqueous ammonia solution is used, instead of potassium hydroxide solution, to adjust the pH. 200 parts of ammonium chloride are then added instead of 100 parts of potassium chloride. 160 parts of a red colorant lake of the formula

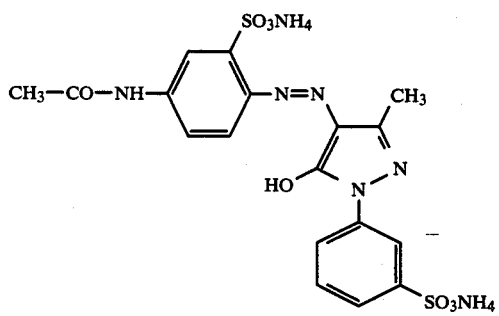

are obtained.

EXAMPLE 9

The procedure followed is as described in Example 1, but 150 parts of barium chloride are used for laking instead of 120 parts of calcium chloride. 230 parts of the corresponding red barium colorant lake are obtained.

EXAMPLE 10

83 parts of 4-chloro-1-aminobenzene-3-sulfonic acid are stirred into 1,000 parts of water and 80 parts by volume of concentrated hydrochloric acid, the mixture is cooled to from 0° to 5° C. with ice, and diazotization is effected by addition of 125 parts by volume of 23% strength sodium nitrite solution.

For the coupling, 124 parts of 1-(3'-sulfophenyl)-3-methylpyrazol-5-one are added to the diazonium salt suspension and the pH is brought to 4–5 with 50% strength sodium hydroxide solution. The mixture is subsequently stirred for one hour, the product is laked by addition of 120 parts of calcium chloride, stirring is continued for another hour and the product is filtered off, washed with water and dried. 195 parts of a reddish yellow azo colorant lake of the formula

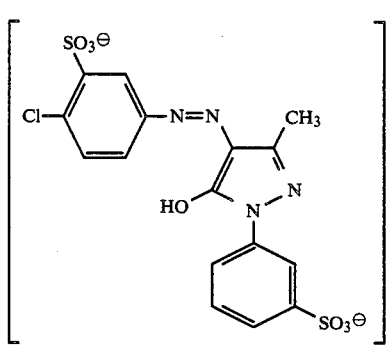

are obtained.

EXAMPLE 11

The procedure followed is as described in Example 10, but 120 parts of magnesium chloride are used for laking instead of 120 parts of calcium chloride. 185 parts of a yellow magnesium colorant lake are obtained.

EXAMPLE 12

The procedure followed is as described in Example 10, but 240 parts of nickel sulfate 7-hydrate are used for laking instead of 120 parts of calcium chloride. 200 parts of the yellow nickel salt of the formula

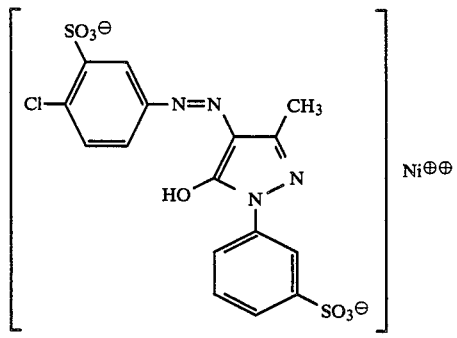

are obtained.

EXAMPLE 13

The procedure followed is as described in Example 10, but 136 parts of 1-(2'-chloro-4'-sulfophenyl)-3-methylpyrazol-5-one are used instead of 124 parts of 1-(3'-sulfophenyl)-methylpyrazol-5-one. 190 parts of a yellow azo colorant lake of the formula

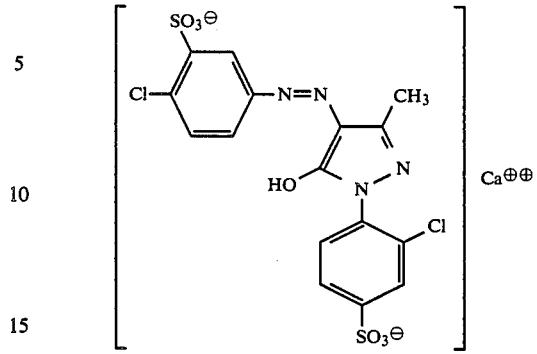

are obtained.

EXAMPLE 14

The procedure followed is as described in Example 10, but 75 parts of 4-methyl-1-aminobenzene-2-sulfonic acid are used instead of 83 parts of 4-chloro-1-aminobenzene-3-sulfonic acid. 175 parts of a greenish yellow calcium lake of the formula

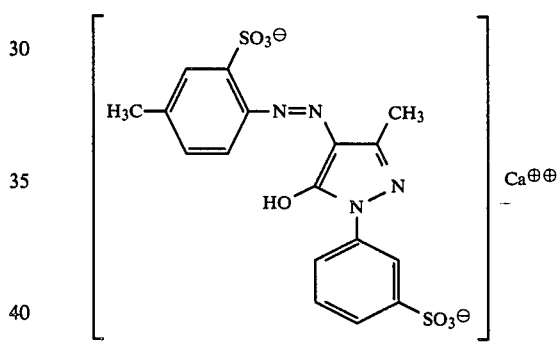

are obtained.

EXAMPLE 15

The procedure followed is as described in Example 10, but 80 parts of 4-methoxy-1-aminobenzene-2-sulfonic acid are used instead of 83 parts of 4-chloro-aminobenzene-3-sulfonic acid. 170 parts of an orange colorant lake of the formula

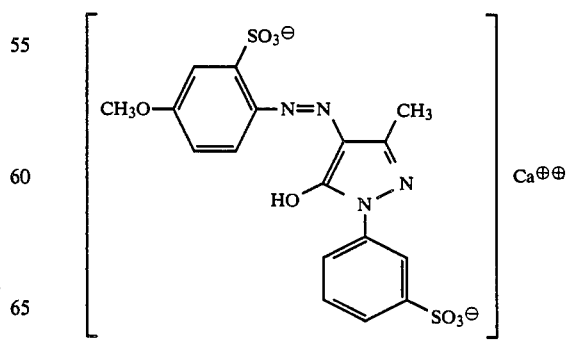

are obtained.

EXAMPLE 16

92 parts of 5-acetylamino-2-aminobenzene-1-sulfonic acid are diazotized as described in Example 1. Excess sodium nitrite is destroyed with amidosulfonic acid, 84 parts of 1-phenyl-3carboxypyrazol-5-one are added and the pH is brought to 4 with sodium hydroxide solution. When the coupling has ended, 120 parts of calcium chloride are added and the mixture is heated at 80° C. After one hour, the product is filtered off and washed with water. 180 parts of an orange azo colorant lake of the formula

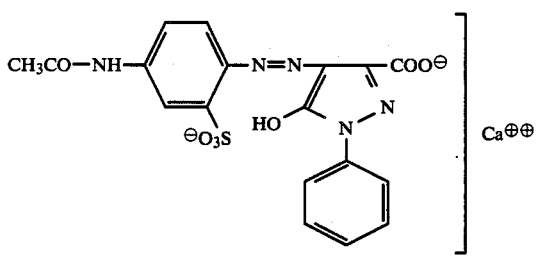

are obtained.

EXAMPLE 17

75 parts of 4-methyl-1-aminobenzene-2-sulfonic acid are diazotized in 1,000 parts of water with 80 parts of concentrated hydrochloric acid and 125 parts of 23% strength sodium nitrite solution. A solution of 135 parts of 1-(4'-methoxy-3'-sulfophenyl)-3-carboxypyrazol-5-one in 400 parts of water is added, the pH is brought to 4 and, when the coupling has ended, 120 parts of calcium chloride are added. The mixture is heated and the product is filtered off and washed to give 220 parts of an orange colorant lake of the formula

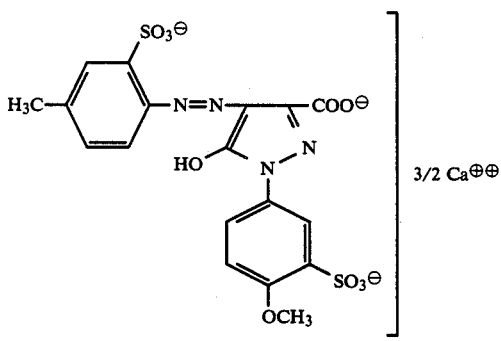

EXAMPLE 18

69 parts of 4-ethoxy-1-aminobenzene-3-sulfonic acid are diazotized with sodium nitrite in hydrochloric acid, and the diazotization product is coupled with 84 parts of 1-phenyl-3-carboxypyrazol-5-one as described in Example 16. 250 parts of a red azo colorant lake of the formula

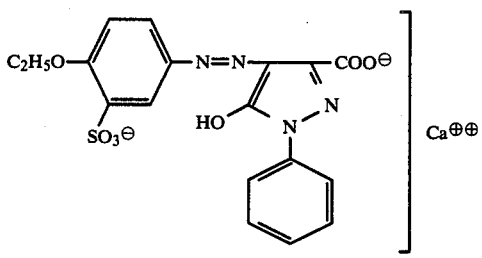

are obtained.

EXAMPLE 19

0.05% of colorant in polyethylene (transparent)

0.05 part of a colorant obtained as described in one of Examples 1-12 is mixed with 100 parts of polyethylene powder (made by a high pressure process) in the dry state in a drum mixer. The mixture is melted on a screw extruder at a barrel temperature of from 160° to 200° C., and is homogenized. The colored plastic mass is granulated by face-cutting or by extrusion of filaments with cooling. The resulting granules are then injection-molded to shaped articles at 200° C. or molded on presses to any desired articles. Colored moldings of excellent lightfastness are obtained.

EXAMPLE 20

0.05% of a colorant in polystyrene (transparent)

0.05 parts of a colorant obtained as described in one of Examples 1-15 is mixed with 100 parts of a ground mass-polymerized polystyrene in the dry state in a drum mixer. The mixture is melted on a screw extruder at a barrel temperature of from 200° to 250° C., and is homogenized. The colored plastic mass is granulated by face-cutting or by extrusion of filaments with cooling. The resulting granules are then injection-molded to shaped articles at from 200° to 250° C. or molded on presses to any desired articles. Yellow, orange and red injection-molded articles with excellent stability to heat are obtained.

Instead of the mass-polymerized polystyrene it is also possible to use a polystyrene emulsion polymer or suspension polymer or a copolymer of polystyrene with butadiene and acrylonitrile or acrylates.

Having now fully described the invention, it will be apparent to one of ordinary skill in the art that many changes and modifications can be made thereto without departing from the spirit or scope of the invention as set forth herein.

We claim:

1. An azo colorant lake of the formula:

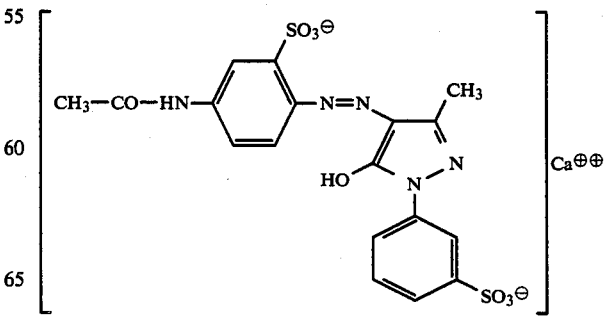

* * * * *